United States Patent

[11] 3,588,535

[72] Inventors Melbourne J. Hellstrom
Severna Park;
Charles L. Laughinghouse, Linthicum, Md.
[21] Appl. No. 662,494
[22] Filed Aug. 22, 1967
[45] Patented June 28, 1971
[73] Assignee Westinghouse Electric Corporation
Pittsburgh, Pa.

[54] CONTROL CIRCUIT WITH TEMPERATURE COMPENSATION
3 Claims, 5 Drawing Figs.

[52] U.S. Cl. .......... 307/235, 307/252, 307/233, 307/310, 330/69, 307/255
[51] Int. Cl. .......... H03k 5/20
[50] Field of Search .......... 330/69; 307/252, 310

[56] References Cited

UNITED STATES PATENTS

| | | | |
|---|---|---|---|
| 2,676,286 | 4/1954 | Buchner | 330/69 |
| 3,188,576 | 6/1965 | Lewis | 307/310 |
| 3,290,520 | 12/1966 | Wennik | 330/69 |
| 3,304,512 | 2/1967 | McMillan | 330/69 |
| 3,310,688 | 3/1967 | Ditkofsky | 330/69 |
| 3,395,265 | 7/1968 | Weir | 307/310 |
| 3,346,817 | 10/1967 | Walker et al. | 330/69 |
| 3,419,810 | 12/1968 | Xylander | 330/69 |
| 2,951,208 | 8/1960 | Barton | 330/14 |

*Primary Examiner*—Donald D. Forrer
*Assistant Examiner*—Harold A. Dixson
*Attorneys*—F. H. Henson, E. P. Klipfel and D. Schron

ABSTRACT: A circuit which will switch power to load in response to a prescribed input signal includes as the switch means, a silicon-controlled rectifier (SCR) having a firing voltage which changes with temperature. A differential amplifier receives an input signal and provides a differential output signal to a complementary detector, the output signal of which is utilized to trigger the SCR to its on state of operation. A current source transistor is provided to control the current in the differential amplifier, and as temperature changes the current source transistor varies the current in the differential amplifier in order to change the gain thereof so that the output of the complementary detector provides a temperature-compensated signal for firing the SCR at the proper signal level.

WITNESSES

Theodore F. Wrobel

James F. Young

INVENTORS
Melbourne J. Hellstrom and
Charles L. Laughinghouse
BY Dean Schron
ATTORNEY

CONTROL CIRCUIT WITH TEMPERATURE COMPENSATION

BACKGROUND OF THE INVENTION

The invention generally relates to control circuits and particularly to temperature-compensated firing circuit for a controlled rectifier device.

SUMMARY OF THE INVENTION

A switch means is provided which activates in response to a firing signal derived from an input signal to a firing circuit. The switch means will activate when the firing signal exceeds a predetermined threshold value, which value varies as a result of changes in temperature. In the broad concept of the invention the firing circuit is controlled with respect to temperature changes in order to adequately compensate for the varying threshold activation voltages of the switch means.

In one embodiment, the firing circuit includes an amplifier section having a gain which is variable in accordance with quiescent bias current therethrough. A temperature-sensitive gain control circuit is provided to regulate the said quiescent bias current in accordance with the temperature changes. A detector means is responsive to the output of the amplifier means, which amplifier means may include a differential amplifier, for providing a temperature-compensated output which is utilized for the activating of the switch means.

If desired, provisions may be made such that the switch means will respond only to input signals of a certain frequency, input signals within a frequency band, or the switch means can be made responsive, for example, only to those input signals having certain prescribed amplitude versus time characteristics. Nonresponsiveness to unwanted signals of certain types may thereby be ensured.

DESCRIPTION OF THE PREFERRED EMBODIMENTS

Figure 1:
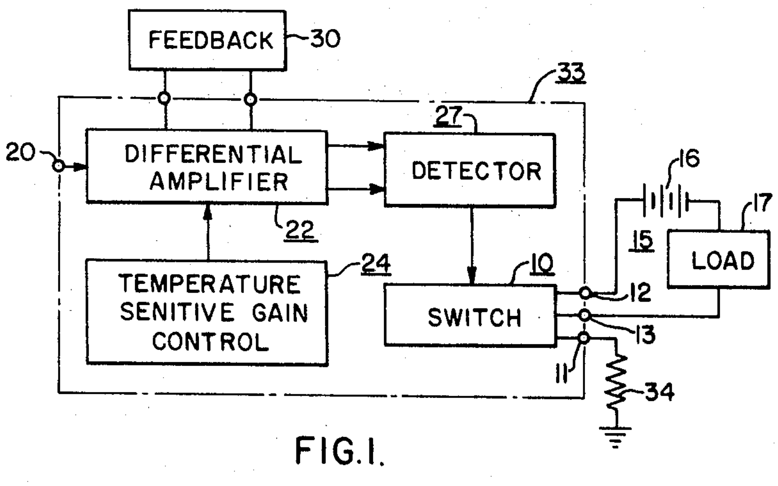
FIG. 1 illustrates, in block diagram form, a preferred embodiment of the invention.

Referring now to FIG. 1, there is illustrated a switch means 10 including an input terminal 11 and first and second terminals 12 and 13 to which is connected an external circuit 15 which by way of example may include a power source such as battery 16 in conjunction with a load 17. It is apparent that the switch means could control other types of external circuits.

The activation of the switch means 10 is in response to predetermined input signals applied, at input terminal 20, to an amplifier means in the form of differential amplifier 22, the gain of which is variable in accordance with the quiescent bias current therethrough. The quiescent bias current for the differential amplifier 22 is supplied by the temperature-sensitive gain control circuit 24, and the output of the differential amplifier 22, as governed by the input signal and the temperature-sensitive gain control circuit 24, is received by the detector means 27 which then provides an output signal utilized to activate the switch means 10.

In order that the switch means 10 may respond only to an input signal of a certain range or band of frequencies, there may be provided a feedback circuit 30 incorporating one or more frequency filter components.

For the temperature compensation scheme described herein it is necessary that certain characteristics of various electronic circuit elements be accurately matched to have substantially the same temperature response and accordingly the control circuit of the present invention is preferably fabricated in integrated circuit form on a single semiconductor chip.

In FIG. 1 the circuits illustrated within the block 33 are illustrative of those which may be fabricated by, for example, planar epitaxial integrated circuit processing on a single piece of silicon or die. With fabrication as an integrated circuit the switch means 10 may take the form of SCR and accordingly an SCR gate resistor 34 may be included as an external component for obtaining selective variation of SCR firing voltage. Where selective variation is not a necessity, the gate resistor may be fabricated as part of the integrated circuit.

Figure 2:
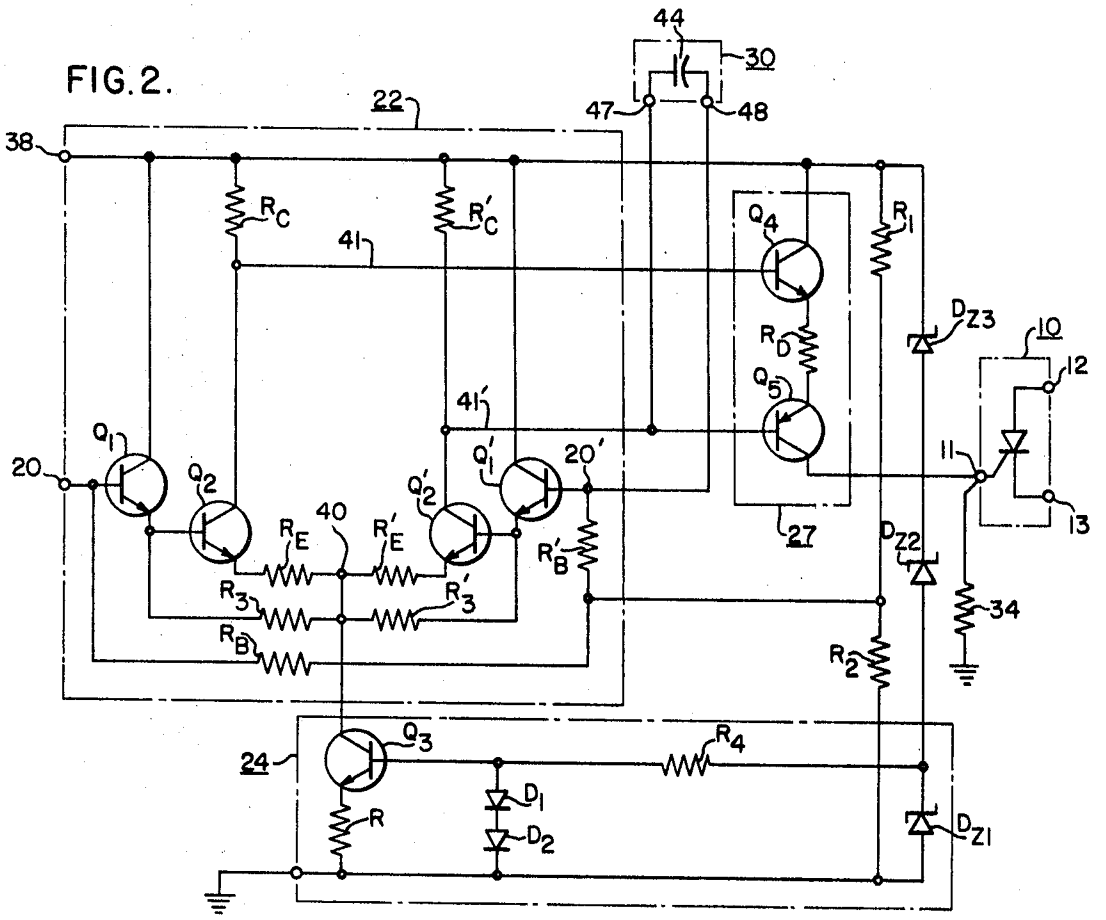
FIG. 2 illustrates, in circuit component form, the embodiment of FIG. 1.

Referring now to FIG. 2, proper operating potential for the control circuit may be applied at bias terminal 38 and the proper bias condition for the various circuits is established by a voltage divider network including resistors $R_1$ and $R_2$ with the voltage across resistors $R_1$ and $R_2$ being established by a voltage regulator means such as the serially connected voltage breakdown Zener diodes $D_{Z1}$, $D_{Z2}$ and $D_{Z3}$.

The differential amplifier 22 includes transistors $Q_1$ and $Q'_1$ forming in conjunction with respective emitter resistors $R_3$ and $R'_3$ differential emitter followers to provide respective input signals to differential amplifier transistors Q2 and $Q'_2$ each having respective emitter resistors $R_E$ and $R'_E$ connected together at a common circuit point 40. Respective resistors $R_C$ and $R'_C$ are connected in the collector circuits of the transistors $Q_2$ and $Q'_2$ which, in response to an input signal at input terminal 20, and/or an input signal at input terminal 20′, will provide a differential output signal at the collectors thereof on output leads 41 and 41′.

Proper base bias for the transistors of the differential amplifier 22 is provided by means of respective base resistors $R_B$ and $R'_B$ connected to the junction between voltage divider resistors $R_1$ and $R_2$. Such differential amplifiers are well known to those skilled in the art.

The gain of the differential amplifier 22 is variable in accordance with the quiescent bias current therethrough. The quiescent bias current for the differential amplifier 22 is provided by transistor $Q_3$ of the temperature-sensitive gain control circuit 24 which functions to provide a bias current variable in accordance with variations in ambient temperature. The base of transistor $Q_3$ is connected through a resistor $R_4$ to the cathode of Zener diode $D_{Z1}$ in order to establish proper base bias conditions. The series diodes $D_1$ and $D_2$ are in parallel with the serial connection of the base-emitter diode of transistor $Q_3$ and resistor R, and fabrication is such that the base-emitter voltage of transistor $Q_3$ is approximately equivalent to the voltage drop across diode $D_1$. Since there is a parallel connection, the remaining diode drop appears across the resistor R in the emitter circuit of transistor $Q_3$ and the current therefore provided by transistor $Q_3$ is approximately $V_D/R$, where $V_D$ is the diode voltage. Since $V_D$ varies inversely with temperature changes the current in transistor $Q_3$ will decrease with temperature rise and increase with temperature fall. If fabricated as an integrated circuit and R is a diffused resistor, its value will vary directly with temperature changes, with the cumulative effect being decreased current with temperature increase and vice versa.

The cumulative effect on the SCR 10 of a temperature increase is to decrease the firing sensitivity, that is, decrease the firing threshold level thereof. The gain control circuit 24 functions in response to a temperature increase, to decrease the quiescent bias current in the differential amplifier 22 which in turn decreases the gain thereof so that an input signal at input terminal 20 does not prematurely activate the SCR 10. Conversely, with a temperature decrease the firing threshold of the level SCR 10 increases, and the quiescent bias current dictated by the gain control circuit 24 increases to increase the gain of the differential amplifier 22 so that a specific input signal level will result in activation of the SCR 10.

The performance of the control circuit is enhanced when the transistors $Q_1$ and $Q'_1$, $Q_2$ and $Q'_2$ are identically matched. With fabrication in integrated circuit form the matching and response of the transistors approaches an optimum and accordingly the quiescent bias current at the collector of transistor $Q_3$ is equally divided between the first transistor pair $Q_1$ and $Q_2$ and the second transistor pair $Q'_1$ and $Q'_2$. Consequently the quiescent bias current in the collector circuit of transistor $Q_2$ is substantially equal to the quiescent bias current in the collector circuit of the transistor $Q'_2$.

With the application of an input signal to input terminal 20, the current in the differential amplifier 22 may be thought of as comprising two components, one component being a quiescent bias current which varies in accordance with the temperature, and the other component being a varying information signal. Since the quiescent bias currents in the collector circuits of transistors $Q_2$ and $Q'_2$ are equal, the differential output signal obtained between the output leads 41 and 41' will be, substantially, an information signal. Accordingly, there is provided the detector circuit 27 for detecting only the information signal as opposed to the nonsignal variations of the quiescent bias current.

The detector 27 includes, by way of example, an NPN transistor $Q_4$ having its emitter coupled through a resistor $R_D$ to the emitter of a PNP transistor $Q_5$. The input, or base of transistor $Q_4$ is connected to the output of transistor $Q_2$ and the base of transistor $Q_5$ is connected to the output of transistor $Q'_2$ such that, in the embodiment shown, an output signal is developed at the collector of transistor $Q_5$ and is governed by the potential by which the collector of transistor $Q_2$ exceeds that of transistor $Q'_2$. The output signal of the detector 27 is utilized to activate the SCR 10, and means are provided for coupling the output signal to the input terminal 11 of the SCR 10. In the embodiment illustrated the coupling means comprises a direct ohmic connection.

The firing signal applied to the input terminal 11 is the voltage across the resistor 34, which voltage is a function of the value of resistor 34 and the current therethrough. The said current is governed by the detector 27. By way of example, if $V_S$ is the potential by which the collector of transistor $Q_2$ exceeds that of transistor $Q'_2$, and if $V_{BE}$ is the base-emitter voltage drop of either transistor $Q_4$ or $Q_5$, then the voltage across resistor $R_D$ will be equal to $V_S - 2V_{BE}$. The current, $I_D$, through $R_D$ is equal to the voltage across $R_D$ divided by the value of $R_D$ and if the relatively small base current in transistor $Q_5$ is neglected, it may be assumed that the current through resistor 34 is $I_D$, a function of the differential output and the value of $R_D$. If the circuit of FIG. 2 is fabricated as an integrated circuit and resistor 34 is an external resistor, the firing sensitivity of the SCR 10 may be controlled by the value of the external resistor 34 chosen. That is, the amplitude of the signal $V_S$ between the collectors of transistors $Q_2$ and $Q'_2$ at which firing of the SCR occurs can be controlled once the circuit is completely fabricated by controlling the value of the external resistor 34.

In many applications it is desired that the SCR 10 be activated only in response to certain predetermined input signals such as signals above a certain frequency, below a certain frequency, or signals within a band of frequencies. The feedback circuit 30 is provided and may incorporate one or more filter elements, a single capacitor 44 being illustrated, whereby selective amplification of the input signals applied to the input terminal 20 is accomplished. The filter components are connected between the output 41' of transistor $Q'_2$ and the input 20' of transistor $Q'_1$ and if fabricated as an integrated circuit, there may be provided first and second terminals 47 and 48 on the integrated circuit structure for the external connection of a feedback network 30.

Figure 3:
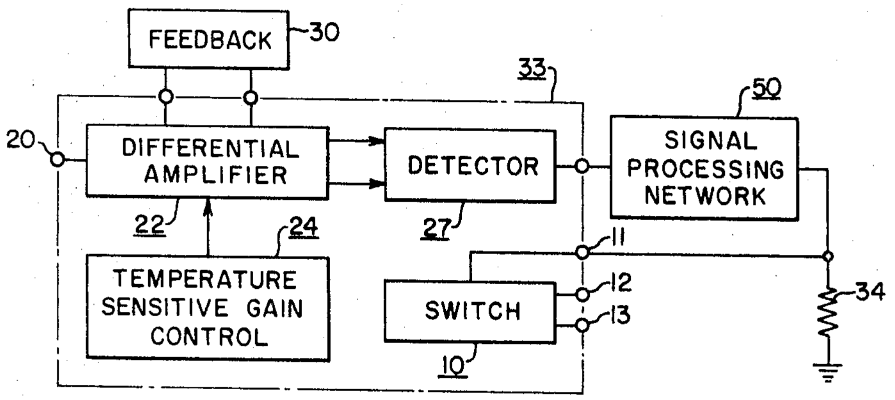
FIG. 3 illustrates another embodiment of the present invention.

FIG. 3 illustrates a modification wherein there is included a signal processing network 50 which comprises means for coupling the output signal of the detector 27 to the input terminal of the SCR 10. The signal processing network 50 is utilized to limit the signals which can activate the SCR 10 to those with special time characteristics or shape characteristics as required by the system in which the circuit is used. When fabricated as an integrated circuit, various components of the control circuit may be incorporated into a single semiconductor chip represented by the block 33. Circuit components of FIGS. 3 and 4 which are similar to those described with respect to FIGS. 1 and 2 have been given like or primed reference numerals or characters.

Figure 4:
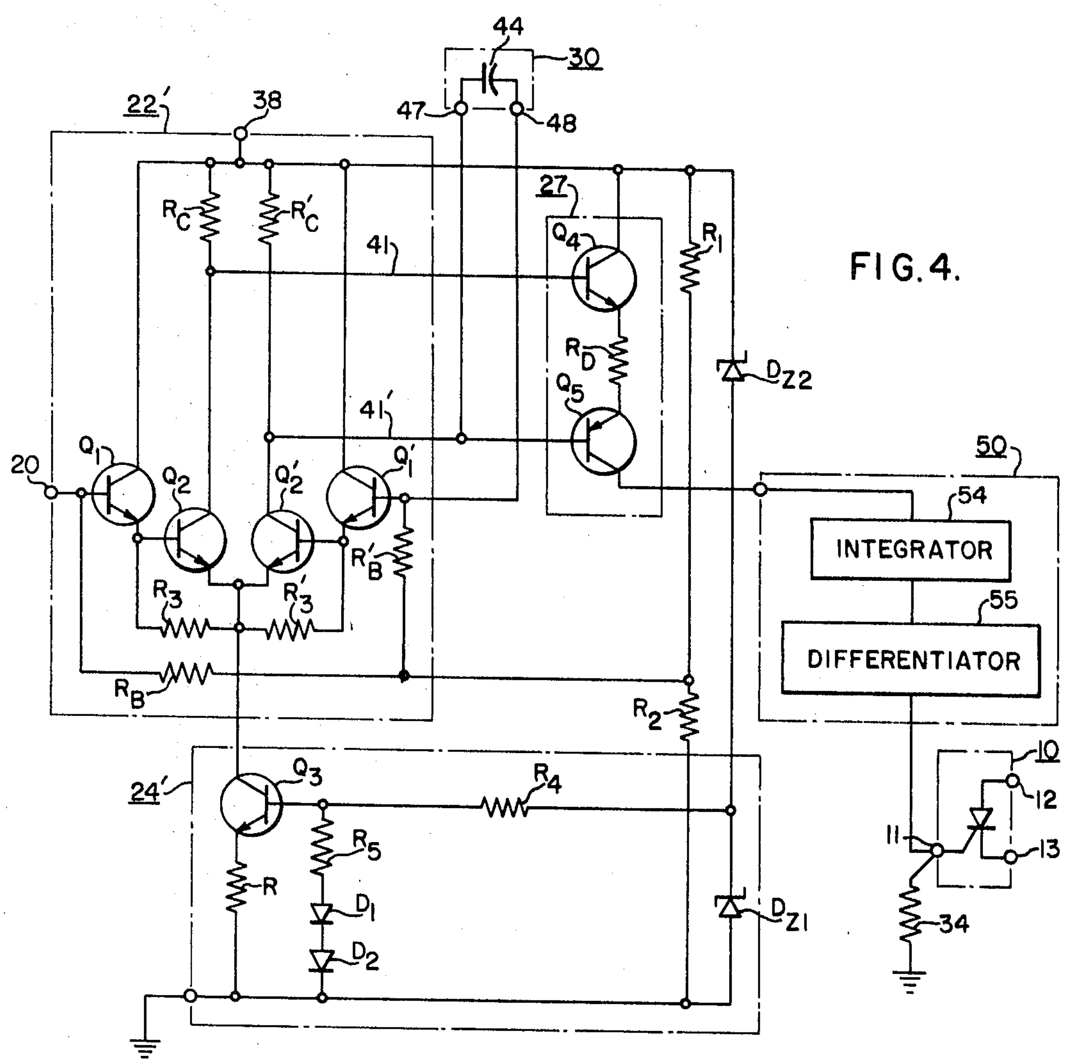
FIG. 4 illustrates, in circuit component form, the embodiment of FIG. 3.

The arrangement of FIG. 4 is in many respects identical to that illustrated in FIG. 2. One variation is the absence of emitter resistors in the differential amplifier circuit 22'. Another variation is the temperature sensistive gain control circuit 24' which includes a resistor $R_5$ in series with diodes $D_1$ and $D_2$. The resistor $R_5$ allows the change in quiescent bias current provided by transistor $Q_3$ as a result of temperature changes, to be adjusted by proper choice of the ratio of resistance $R_4$ to $R_5$.

The signal processing network 50 is shown, by way of example only, to include two networks, an integrating means 54 and a differentiating means 55 provided in order that the SCR 10 activation be only in response to input signals of a certain function and to be nonresponsive to spurious signals or input signals other than those desired.

The detector portion 27 of the control circuit includes a PNP transistor $Q_5$. When it is desired to fabricate an integrated circuit having both a PNP and an NPN transistor the arrangement of FIG. 5 may be utilized.

Figure 5:
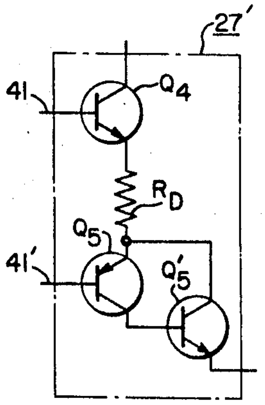

FIG. 5, wherein components similar to those in FIGS. 2 and 4 have been given like reference numerals or characters, illustrates a detector circuit 27 wherein PNP transistor $Q_5$ may be simultaneously fabricated with the complementary NPN transistor $Q'_5$ in accordance with the teachings of U.S. Pat. No. 3,197,710, H. C. Lin, issued July 27, 1965. Generally, in such arrangement, the PNP transistor $Q_5$ will not, by itself, provide sufficient amplification and therefore the NPN transistor is provided in the structure for complementary amplification.

Although the present invention has been described with a certain degree of particularity, it should be understood that the present disclosure has been made by way of example and that modifications and variations of the present invention are made possible in the light of the above teachings.

We claim:

1. A control circuit comprising:

A. switch means including an input terminal, and first and second terminals, and operable upon the application of an input firing signal exceeding a threshold value to activate said switch means, said threshold value being temperature dependent and subject to changes in response to corresponding temperature changes;

B. amplifier means responsive to an input signal for providing an output signal, said amplifier means having a gain which is variable in accordance with quiescent bias current therethrough and including a differential amplifier having first and second outputs;

C. a temperature-sensitive gain control circuit operatively connected to said amplifier means for changing said quiescent bias current as temperature changes to change the gain of said amplifier means;

D. detector means coupled to said amplifier means for detecting substantially only said output signal as opposed to nonsignal variations in said quiescent bias current, said detector means being operable to provide an output signal dependent upon the gain of said amplifier means and including an NPN transistor having its base connected to said first output, a PNP transistor having its base connected to said second output and resistor means connecting the emitters of said NPN and PNP transistors;

E. means for coupling the output signal of said detector means to said input terminal of said switch means;

F. said output signal of said detector means being varied by the varied gain of said amplifier means to compensate for temperature variations of said threshold value of said switch means.

2. A control circuit comprising:

A. switch means including an input terminal, and first and second terminals, and operable upon the application of an input firing signal exceeding a threshold value to activate said switch means, said threshold value being temperature dependent and subject to changes in response to corresponding temperature changes;

B. amplifier means responsive to an input signal for providing an output signal, said amplifier means having a gain which is variable in accordance with quiescent bias current therethrough;
C. a temperature sensitive gain control circuit operatively connected to said amplifier means for changing said quiescent bias current as temperature changes to change the gain of said amplifier means;
D. detector means coupled to said amplifier means for detecting substantially only said output signal as opposed to nonsignal variations in said quiescent bias current, said detector means being operable to provide an output signal dependent upon the gain of said amplifier means;
E. means for coupling the output signal of said detector means to said input terminal of said switch means;
F. said output signal of said detector means being varied by the varied gain of said amplifier means to compensate for temperature variations of said threshold value of said switch means;
G. a voltage divider network;
H. a plurality of serially connected voltage breakdown diodes in parallel circuit relationship with said voltage divider network;
I. said temperature-sensitive gain control circuit including,
  1. a transistor,
  2. first resistance means connecting the emitter of said transistor to a point of reference potential,
  3. diode means connected in circuit between the base of said transistor and said point of reference potential, and
  4. second resistance means connecting the base of said transistor to a junction between two of said serially connected voltage breakdown diodes.

3. A control circuit comprising:
A. switch means including an input terminal, and first and second terminals, and operable upon the application of an input firing signal exceeding a threshold value to activate said switch means, said threshold value being temperature dependent and subject to changes in response to corresponding temperature changes;
B. amplifier means responsive to an input signal for providing an output signal, said amplifier means having a gain which is variable in accordance with quiescent bias current therethrough and including a differential amplifier having first and second inputs and first and second outputs;
C. a temperature-sensitive gain control circuit operatively connected to said amplifier means for changing said quiescent bias current as temperature changes to change the gain of said amplifier means;
D. detector means coupled to said amplifier means for detecting substantially only said output signal as opposed to nonsignal variations in said quiescent bias current, said detector means being operable to provide an output signal dependent upon the gain of said amplifier means;
E. means for coupling the output signal of said detector means to said input terminal of said switch means;
F. said output signal of said detector means being varied by the varied gain of said amplifier means to compensate for temperature variations of said threshold value of said switch means;
G. a feedback network including at least one frequency filter component, connected between said second output and second input of said differential amplifier.